(12) United States Patent
Natsume et al.

(10) Patent No.: US 8,882,316 B2
(45) Date of Patent: Nov. 11, 2014

(54) VEHICULAR LAMP

(75) Inventors: Kazunori Natsume, Shizuoka (JP); Hajime Arai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 238 days.

(21) Appl. No.: 13/234,569

(22) Filed: Sep. 16, 2011

(65) Prior Publication Data

US 2012/0069592 A1 Mar. 22, 2012

(30) Foreign Application Priority Data

Sep. 17, 2010 (JP) ................................ 2010-209270

(51) Int. Cl.
| | |
|---|---|
| *F21V 9/00* | (2006.01) |
| *F21V 19/02* | (2006.01) |
| *F21V 5/00* | (2006.01) |
| *F21S 8/10* | (2006.01) |
| *B60Q 1/00* | (2006.01) |

(52) U.S. Cl.
CPC ........... *B60Q 1/0052* (2013.01); *F21S 48/2268* (2013.01); *F21S 48/22* (2013.01); *F21S 48/2287* (2013.01); *F21S 48/2237* (2013.01); *F21S 48/25* (2013.01); *F21S 48/215* (2013.01); *F21S 48/328* (2013.01); *F21S 48/24* (2013.01)
USPC ............................ 362/511; 362/520; 362/528

(58) Field of Classification Search
USPC ......................................... 362/511, 520, 558
See application file for complete search history.

(56) References Cited

U.S. PATENT DOCUMENTS

| | | | | |
|---|---|---|---|---|
| 4,949,226 A | * | 8/1990 | Makita et al. ................. | 362/538 |
| 6,280,044 B1 | | 8/2001 | Kusakabe | |
| 6,896,397 B2 | * | 5/2005 | Yamada et al. ................ | 362/511 |
| 7,111,970 B2 | * | 9/2006 | Gasquet ......................... | 362/539 |
| 7,229,197 B2 | * | 6/2007 | Tanaka et al. ................. | 362/494 |
| 7,278,768 B2 | * | 10/2007 | Gasquet ......................... | 362/539 |
| 7,775,697 B2 | * | 8/2010 | Hirano et al. ................. | 362/511 |

(Continued)

FOREIGN PATENT DOCUMENTS

| | | |
|---|---|---|
| JP | 04-039801 A | 2/1992 |
| JP | 09-152360 A | 6/1997 |
| JP | 2000-040412 A | 2/2000 |
| JP | 2000-0404012 A | 2/2000 |

(Continued)

OTHER PUBLICATIONS

Japanese Office Action issued Mar. 4, 2014 in Japanese Patent Application No. 2010-209270.

*Primary Examiner* — Jong-Suk (James) Lee
*Assistant Examiner* — Bryon T Gyllstrom
(74) *Attorney, Agent, or Firm* — Sughrue Mion, PLLC

(57) ABSTRACT

A linear light guide or light guides disposed in a lamp chamber have a light guide neighboring region, in which the portions close to light incidence end portions are close to each other, and a light-emitting portion or portions are disposed so as to be offset from a luminous region of a light source unit and to have portions that extend from the light guide neighboring region and separate from each other. A translucent diffusion cover that covers the light guide neighboring region is provided at least in front of the light guide neighboring region. Part of the light from the light guide neighboring region is diffused by the diffusion cover and then emitted through the diffusion cover, so that light emitted through the light-emitting portion and the diffusion cover is continuous, so that it appears as if the light guide that is continuous is emitting light.

9 Claims, 10 Drawing Sheets

(56) References Cited

U.S. PATENT DOCUMENTS

| | | | |
|---|---|---|---|
| 2003/0193815 A1* | 10/2003 | Mishimagi | 362/522 |
| 2004/0130904 A1* | 7/2004 | Yamada et al. | 362/487 |
| 2004/0136203 A1* | 7/2004 | Gasquet | 362/543 |
| 2007/0008736 A1* | 1/2007 | Gasquet | 362/511 |
| 2010/0008088 A1* | 1/2010 | Koizumi et al. | 362/235 |

FOREIGN PATENT DOCUMENTS

| | | |
|---|---|---|
| JP | 2001-014921 A | 1/2001 |
| JP | 2002-367403 A | 12/2002 |
| JP | 2008-258037 A | 10/2008 |
| JP | 2009-295552 A | 12/2009 |

* cited by examiner

F I G . 9
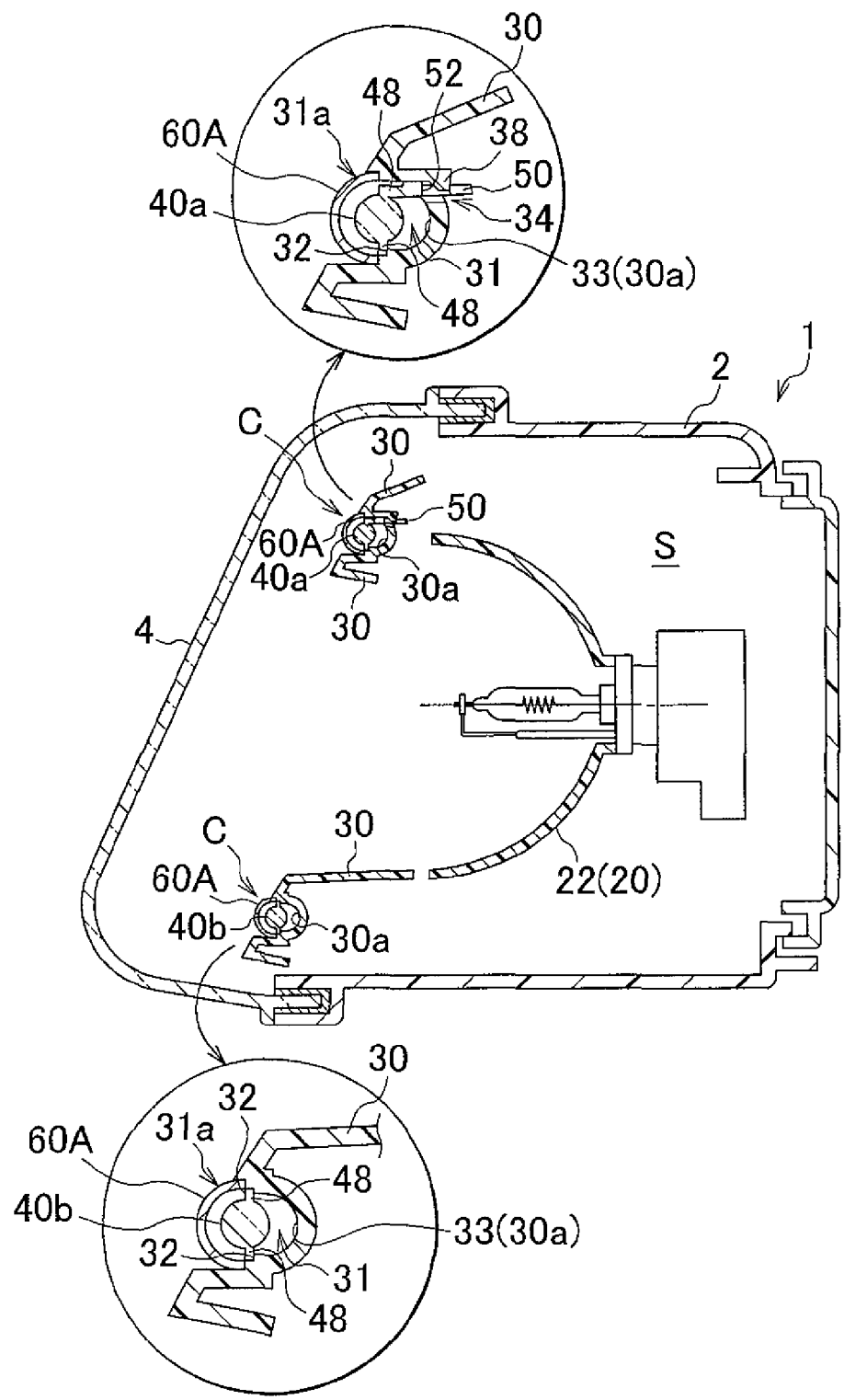

VEHICULAR LAMP

INCORPORATION BY REFERENCE

The disclosure of Japanese Patent Application No. 2010-209270 filed on Sep. 17, 2010 including the specification, drawings and abstract is incorporated herein by reference in its entirety.

BACKGROUND OF THE INVENTION

1. Field of the Invention

The present invention relates to a vehicular lamp, in which a linear light guide serving as a light-emitting object is accommodated in a lamp chamber defined by an outer cover and a lamp body and in particular to a vehicular lamp configured so that it appears as if the linear light guide is continuous at the point, at which portions of the linear light guide are adjacent to each other.

2. Description of Related Art

Examples of the vehicular lamp, such as a clearance lamp and a day time running lamp, for making drivers of the cars in the opposite lane and others recognize the host vehicle include a lamp, in which light source light is reflected by a reflector to distribute the light, and a lamp, in which light source light is diffused by the steps on a lens to distribute the light.

In recent years, a lamp is available, in which light source light is introduced into a linear light guide and is emitted through the entire side surface of the light guide. This kind of lamp is described in, for example, Japanese Patent Application Laid-Open (Kokai) No. 2009-295552 (JP-A-2009-295552) (paragraph 0028, FIG. 2), in which a linear light guide made of synthetic resin and a light emitting diode (LED), serving as a light source, that is disposed at an end portion of the light guide are used to emit light, the light guide being disposed in a loop shape so as to be offset from the luminous region of (an)other light source unit(s), such as the headlamp and the turn signal lamp (so as not to interfere with the formation of light distribution by (an)other light source unit(s)).

In JP-A-2009-295552, in order to dispose the light guide so as to be offset from the luminous region of the (an)other light source unit(s), a loop shape is formed by crossing end portions of an elongated linear light guide.

Thus, first, the appearance is impaired because the intersection portion of the light guide can be seen through the outer cover when the LEDs are unlit. Second, since the intersection portion of the light guide is brighter than the other portion and it does not appear as if the entire light guide is uniformly emitting light, the sense of continuity or unity of the entire light guide is not provided (the light guide does not look like a continuous light-emitting object).

SUMMARY OF THE INVENTION

The present invention provides a vehicular lamp with a favorable appearance that makes a linear light guide disposed in a lamp chamber appear as if it is continuous.

A vehicular lamp according to an aspect of the present invention includes: an outer cover and a lamp body that define a lamp chamber; a light source unit that is disposed in the lamp chamber; a linear light guide that is provided between the outer cover and the light source unit and is configured so that light incident on a light incidence end portion of the light guide is repeatedly reflected inward to be guided and the guided light is emitted through a side surface of the light guide; and a light source that faces the light incidence end portion of the light guide. The light guide has a light guide neighboring region, in which a light incidence end side portion that is a portion of the light guide on a side closer to the light incidence end portion and another light incidence end side portion of the same or another light guide neighbor each other. A light-emitting portion of the light guide is disposed so as to be offset from a luminous region of the light source unit and to have portions that extend from the light guide neighboring region and separate from each other. A translucent diffusion cover that covers the light guide neighboring region is provided at least in front of the light guide neighboring region. Thus, part of the light from the light guide neighboring region is diffused by the diffusion cover and then emitted and therefore, light is emitted through the light-emitting portion and the diffusion cover, so that it appears as if a light guide that is continuous at the light guide neighboring region is emitting light. Note that the light incidence end side portion means a portion of the light guide that is on the side closer to the light incidence end portion with respect to the center of the light guide in the longitudinal direction of the light guide. The luminous region means a region that coincides with the light source unit when viewed from the front of the lamp and therefore, by disposing the light-emitting portion of the light guide so as to be offset from the luminous region, the light-emitting portion of the light guide is disposed so as not to block necessary part of the light emitted forward by the light source unit.

Before the above-described present invention was made, the present inventors considered that the intersection portion would not occur if, for example, two linear light guides were used, one end of each of the light guides was placed adjacent to each other, and the light-emitting portions of the light guides were extended so as to separate from each other. However, a new problem arises that, since a gap occurs in the light guide neighboring region, in which the light guides are disposed adjacent to each other, the sense of continuity (unity) of the light guide is not provided in either of the case where the light source is lit and the case where the light source is unlit.

In view of this fact, the present inventors considered that, if a translucent diffusion cover was provided in front of the light guide neighboring region (especially in front of the gap), the light would be diffused by the diffusion cover and the gap between the light guides would therefore become hard to see when the light source was unlit and on the other hand, when the light source was lit, the light emitted from the light guide neighboring region would be diffused by the diffusion cover and therefore, light would be emitted so as to fill the gap, which would make the light guide look like a continuous light-emitting object.

The present inventors actually made a prototype and found that the above effect is achieved, which has lead to this application for patent.

When, for example, two linear light guides are disposed so that the light incidence end side portions are placed side by side and the light-emitting portions of the light guides are disposed so as to be offset from the luminous region of (an)other light source(s) (so as not to interfere with the formation of light distribution by the (an)other light source unit(s)) and to separate from each other, a gap occurs between the light guides at the light incidence end side portions that are portions of the light guides adjacent to each other, so that, in such a light guide neighboring region, when the light source is lit, the lit appearance is such that the light guides look separated from each other and on the other hand, when the light source is unlit, it can be seen through the outer cover that the light guides are two separate light guides.

Also when a single light guide is disposed so that the light incidence end side portions (two end portions of the same light guide) are placed side by side and the light-emitting portion is disposed in a loop shape so as to have portions that separate from each other and to be offset from the luminous region of (an)other light source unit(s), a gap occurs in the light guide neighboring region and the discontinuity of the light guide occurs similarly.

According to the present invention, however, the translucent diffusion cover is provided to cover the light guide neighboring region, so that the light transmitted from the inner side of the diffusion cover is diffused by the diffusion cover, which makes the gap between the light guides hard to see when the light source is unlit.

When the light source is lit, part of the light emitted through the light guide(s) in the light guide neighboring region is diffused by the diffusion cover that covers the front side of the light guide neighboring region and then emitted through the diffusion cover so as to fill the gap between the light guide(s) and as a result, light is emitted through the light-emitting portion of the light guide(s) and the diffusion cover, so that it appears as if the entire light guide is emitting light without discontinuity.

In addition, when a light-shielding cover is provided, adjacent to the diffusion cover, to cover the light incidence end portion of the light guide, the light coming from the vicinity of the light incidence end portion that is unwanted in view of the purpose of making the entire light guide(s) appear as if the light guide(s) is/are emitting light without discontinuity, is shielded.

When the light incidence end side portions (two end portions) of a single linear light guide are crossed to make these portions of the light guide adjacent to each other as described in JP-A-2009-295552, the light guide neighboring region (light guide intersection portion) can be seen through the outer cover and when the light source is lit, the light guide neighboring region is brighter than the other part of the side surface of the light guide and therefore, the light guide does not look like a continuous, single light guide (light-emitting object). This also applies when the light incidence end side portion of each of two linear light guides is close to each other.

However, when the density of the light distribution formation portion (reflection steps, dots, etc. for emitting the reflected light toward the front side of the light guide) that is provided on the back side surface of the linear light guide substantially throughout the length of the light guide is set lower only in the portion corresponding to the light guide neighboring region, the brightness of the light from the light guide neighboring region is regulated in accordance with the brightness of the other part of the light guide, so that it is possible to make the light guide(s) appear as if the entire light guide disposed is uniformly emitting light. In addition, since the light guide is covered by the diffusion cover, the reduction of the density of the light distribution formation portion in the portion of the light guide corresponding to the light guide neighboring region is hidden and cannot been seen through the outer cover.

Thus, according to the present invention, the linear light guide disposed in a lamp chamber appears as if it is a continuous linear light guide (light-emitting object), so that a vehicular lamp with a favorable appearance is provided.

In addition, the lit appearance is achieved that provides a sense of unity of the entire linear light guide disposed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a longitudinal cross-sectional view of the headlamp (cross-sectional view taken along the line IX-IX shown in FIG. 7);

DETAILED DESCRIPTION OF EMBODIMENTS

Embodiments of the present invention will be described below.

Figure 1:
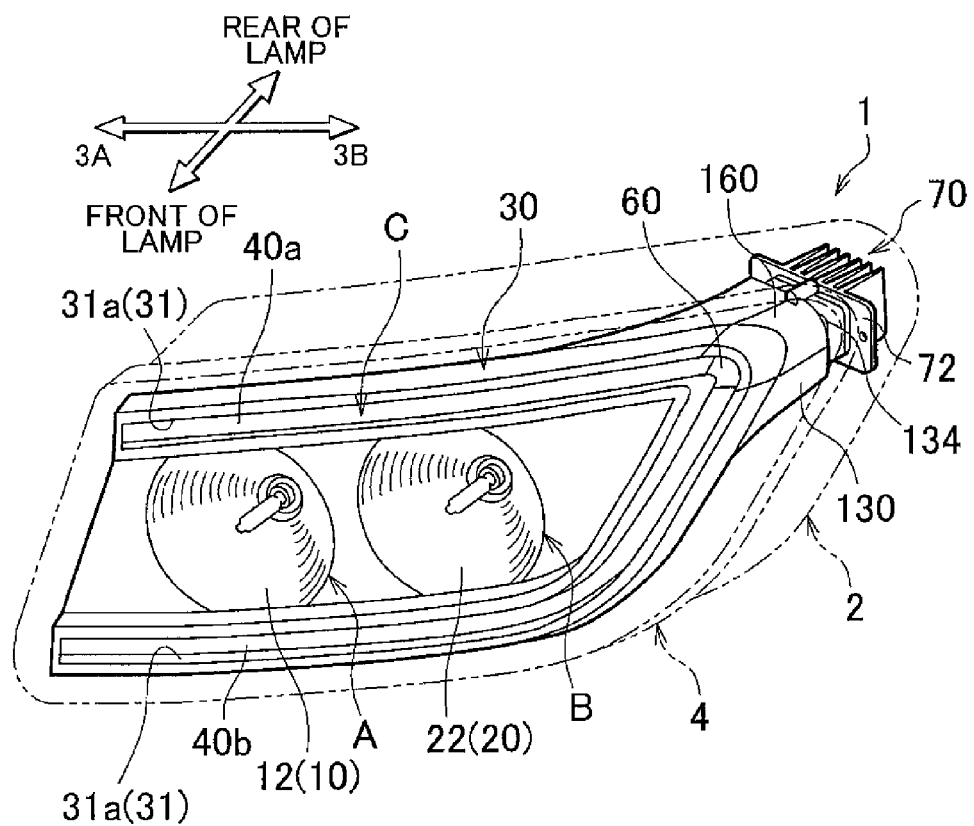
FIG. 1 is a perspective view of an automobile headlamp according to a first embodiment of the present invention.
Figure 2:
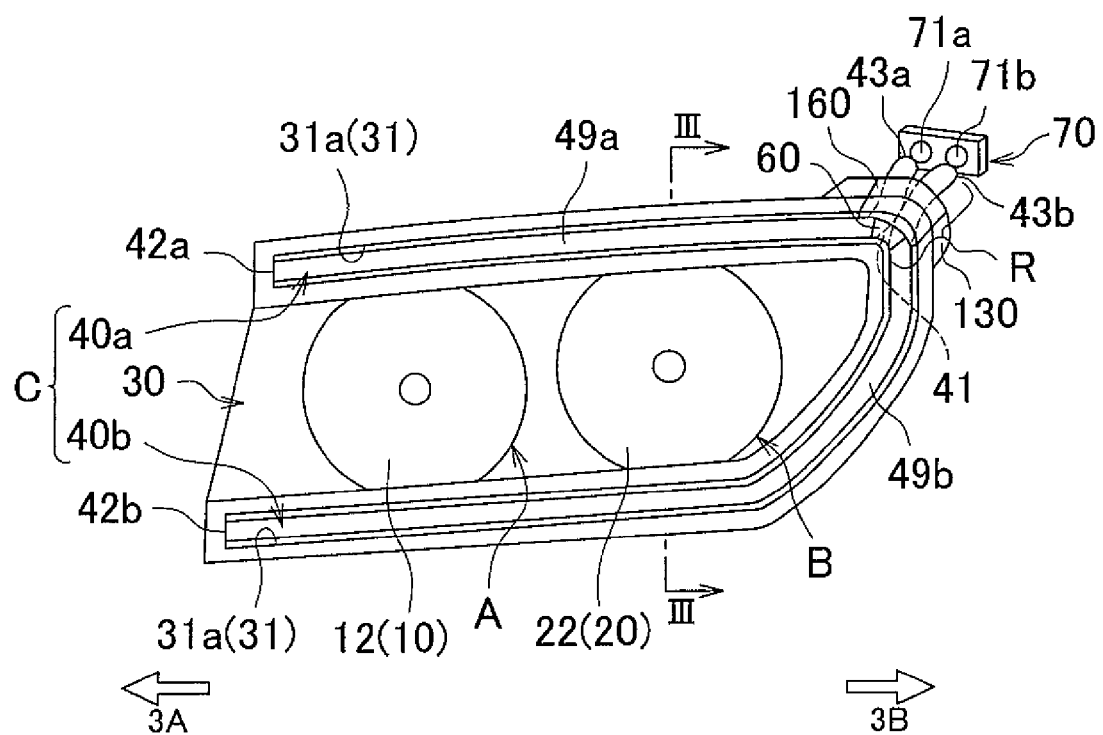
FIG. 2 is a front view of the headlamp with an outer cover and a lamp body removed.
Figure 3:
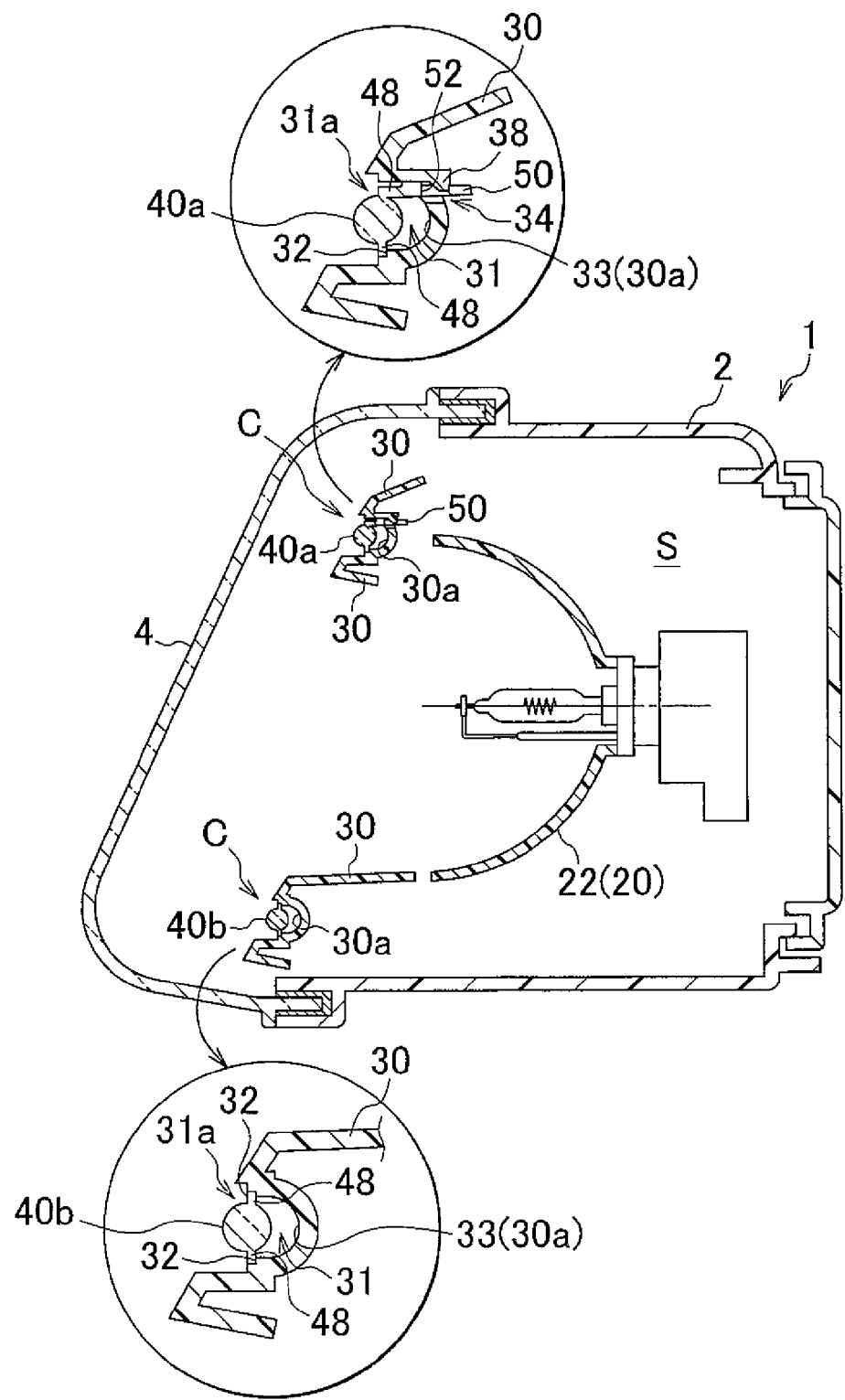
FIG. 3 is a longitudinal cross-sectional view of the headlamp (cross-sectional view taken along the line III-III shown in FIG. 2)
Figure 4:
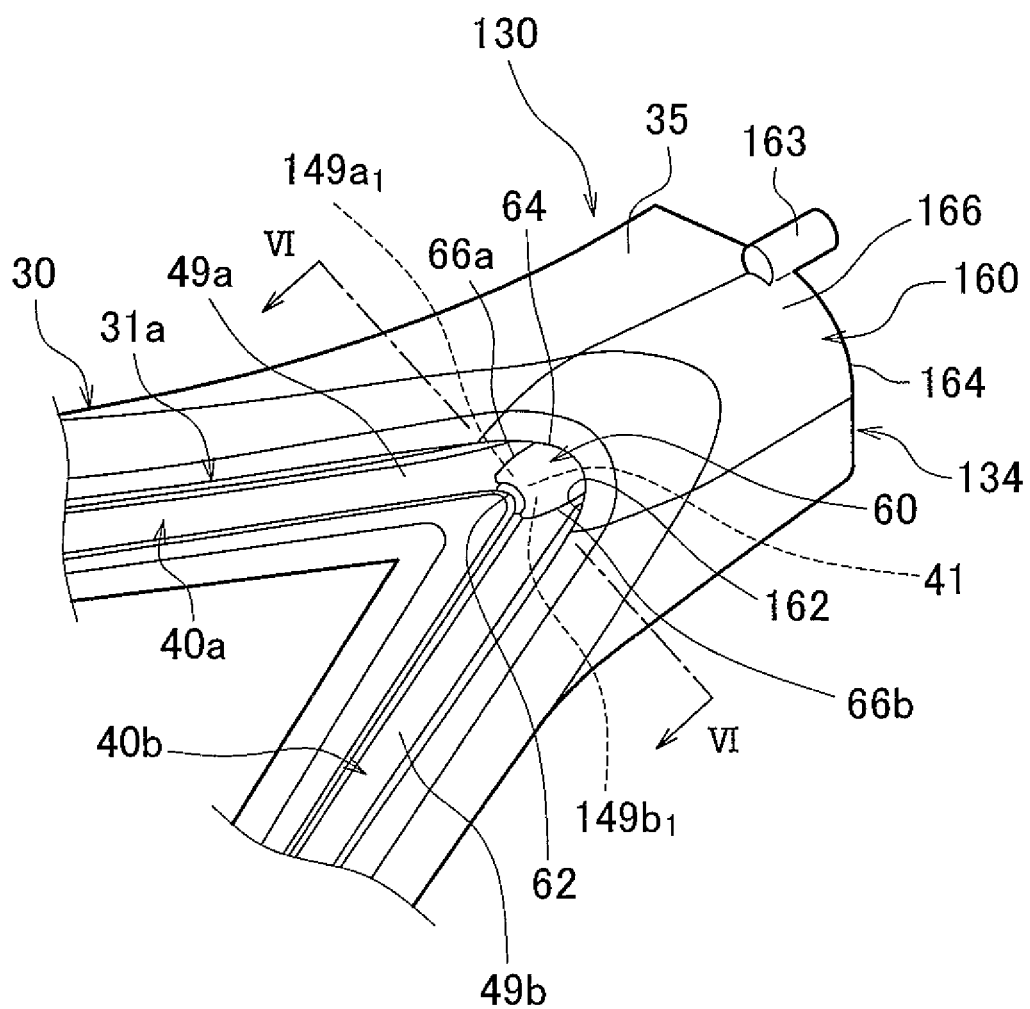
FIG. 4 is an enlarged perspective view of a main portion of the headlamp.
Figure 5:
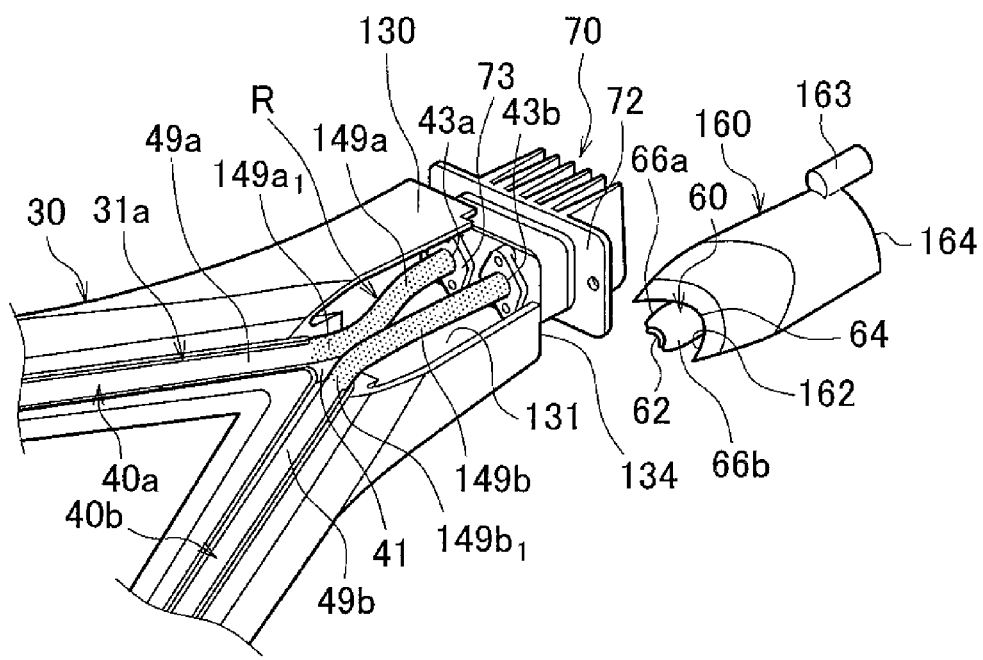
FIG. 5 is an enlarged perspective view of the main portion with a cover removed.
Figure 6:
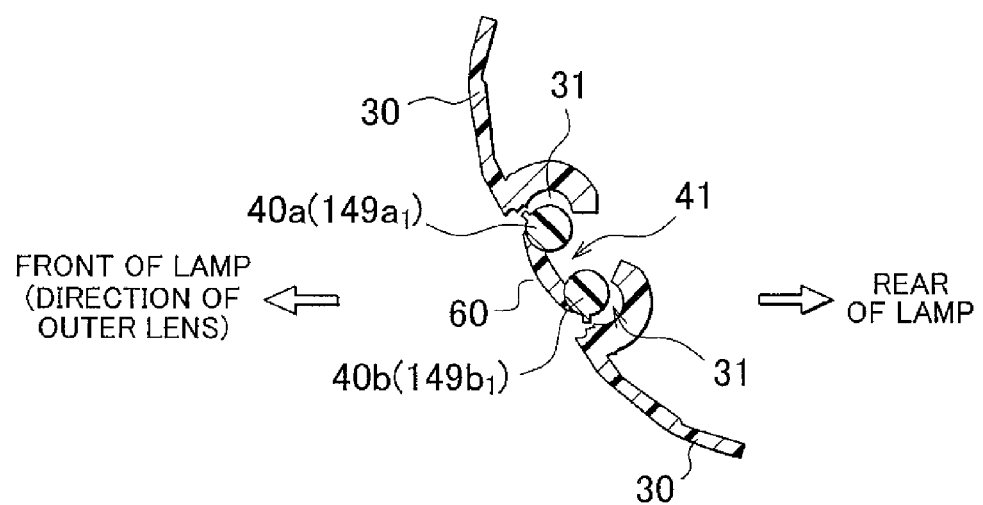
FIG. 6 is a longitudinal cross-sectional view of the main portion (cross-sectional view taken along the line VI-VI shown in FIG. 4)

FIGS. 1 to 6 show an automobile headlamp according to a first embodiment of the present invention. FIG. 1 is a perspective view of the automobile headlamp according to the first embodiment of the present invention. FIG. 2 is a front view of the headlamp with an outer cover and a lamp body removed. FIG. 3 is a longitudinal cross-sectional view of the headlamp (cross-sectional view taken along the line III-III shown in FIG. 2). FIG. 4 is an enlarged perspective view of a main portion of the headlamp. FIG. 5 is an enlarged perspective view of the main portion with a cover removed. FIG. 6 is a longitudinal cross-sectional view of the main portion (cross-sectional view taken along the line VI-VI shown in FIG. 4). In FIG. 2, a light emitting diode (LED) assembly 70 is simplified. In FIG. 3, portions of a lamp C are shown in the circles, in which the portions are enlarged. The upper circle corresponds to the portion, in which a projection-and-pit lance engagement portion is formed, and the lower circle corresponds to the portion, in which there is no engagement portion.

In these figures, the vehicular headlamp 1 is a lamp provided on the right side when viewed from the front of the vehicle (left side when viewed from the driver's seat). The reference sign S indicates a lamp chamber of the headlamp 1 that is defined by the lamp body 2 and the transparent outer cover 4. A front opening of the lamp body 2, the outer cover 4, and the inside of the lamp chamber S are formed to be three-dimensionally curved so as to extend from a vehicle front end center portion 3A side toward a vehicle side 3B in conformity with a stream line shape of a vehicle body and have a rounded parallelogram shape that is inclined to rise toward the right when viewed from the front of the lamp.

In the lamp chamber S, a front turn signal lamp A and a low beam lamp B are accommodated side by side, the front turn signal lamp A including a light source unit 10 provided with a bowl-shaped reflector 12 and being positioned on the side closer to the vehicle front end center portion 3A, the low beam lamp B including a light source unit 20 provided with a bowl-shaped reflector 22 and being positioned on the side closer to the vehicle side B. A day time running lamp (clearance lamp at night) C fixed to an extension 30, which is a decoration member, is disposed, in a C shape that is inclined to rise toward the right when viewed from the front, so as to be offset from a luminous region formed by the light distribution via the reflectors 12 and 22 of the lamps A and B (disposed so as not to interfere with the formation of the light distribution by the reflectors 12 and 22) and to surround the lamps A and B. Note that the day time running lamp C may be disposed so as to extend through part of the region surrounding the lamp A or B.

Specifically, the extension 30 for hiding the gap between the lamp body 2 and the light source units 10 and 20 is disposed between the outer cover 4 and the light source units 10 and 20.

The extension 30 has a rounded parallelogram shape in conformity with the front opening of the lamp body 2 when viewed from the front and a surface 35 of the extension 30 is aluminized. An opening is provided at the center of the extension 30 so as to expose the reflectors 12 and 22 of the light source units 10 and 20 and the upper right portion of the extension 30 when viewed from the front is an LED assembly attachment portion 130 that cylindrically extends toward the rear of the lamp. The LED assembly 70, in which LEDs 71a and 71b serving as the light sources of the day time running lamp C are mounted on the front side of a printed circuit board 72, is disposed at a rear opening 134 of the LED assembly attachment portion 130.

A groove 31 having a semicircular cross section that is concave toward the rear of the lamp is formed in the extension 30 to extend along the extension 30 and a plurality of engagement holes 34, for each of which a hook portion 38 is provided on the inner surface thereof, are formed in the groove 31 at predetermined positions (FIG. 3).

In addition, step portions 32 are formed along the groove 30 at an opening 31a of the groove 30 and a front surface 33 in the groove 31 is aluminized and grained so as to form a reflector portion 30a that distributes the light reflected by the front surface 33 so that the reflected light is directed toward the front of the lamp (FIG. 3).

Part of the right side and the top side of the LED assembly attachment portion 130 is cut from a rear opening 134 to the opening 31a of the groove 31, so that the upper right portion is open (FIG. 5). A light-shielding cover 160 to be described later is attached to such an upper right opening 131.

Next, the day time running lamp C will be described in detail. The day time running lamp C includes a straight linear light guide 40a and a generally L-shaped linear light guide 40b that are made of transparent synthetic resin, such as acrylic resin, and that each have a generally circular cross section. The light guide 40a is attached to the extension 30 and disposed at an upper area when viewed from the front of the lamp and the light guide 40b is attached to the extension 30 and disposed at lower and right areas when viewed from the front of the lamp, so that the whole of the light guide 40a and the light guide 40b form a C shape that is inclined to rise toward the right when viewed from the front of the lamp. The whole of the light guides 40a and 40b are three-dimensionally curved so as to extend from the vehicle front end center portion 3A side toward the vehicle side 3B in conformity with the shape the headlamp 1.

Each of one end portions 43a and 43b of the light guides 40a and 40b is fixed to the front side of the LED assembly 70 via a base 73, whereby the light guides 40a and 40b are connected so that the emission axes of the LEDs 71a and 71b are perpendicular to the end faces of the end portions 43a and 43b, respectively (the end portions 43a and 43b will hereinafter be referred to as the light incidence end portions 43a and 43b).

Ribs 48 are integrally formed on the side of each of the light guides 40a and 40b, except in predetermined regions 149a and 149b near the light incidence end portions 43a and 43b, at the boundaries between the front side and the back side, the ribs 48 each having a rectangular cross section. A fixing portion 50 that extends from the rib 48 toward the rear of the lamp is formed at a plurality of portions of the light guides 40a and 40b corresponding to the portions of the extension 30, in which the engagement holes 34 are formed. The projection-and-pit lance engagement between lance holes 52 formed in such fixing portions 50 and (the hook portions 38 of) the engagement holes 34 of the extension 30 allows the light guides 40a and 40b to be fixed to (the groove 31 of) the extension 30 (FIG. 3). In addition, the ribs 48 are in contact with the step portions 32 of the extension 30, so that the light guides 40a and 40b are held also in the vertical direction with respect to the lamp. Thus, the light guides 40a and 40b are fixed to and held by (the groove 31 of) the extension 30 in a state where the back side of each of the light guides 40a and 40b is covered by the reflector portion 30a.

In addition, on the back side of the light guides 40a and 40b, reflection steps 47 (not shown) that are formed in the form of prism-like grooves are formed as the light distribution formation portion throughout the length of the light guides 40a and 40b with a predetermined pitch except the predetermined regions 149a and 149b near the light incidence end portions 43a and 43b.

The light incident on the light incidence end portions 43a and 43b is reflected by the reflection steps 47 so as to be guided toward the other end portions 42a and 42b and uniformly emitted from the front side of the light guides 40a and 40b (portions of the light guides 40a and 40b, at which the reflection steps 47 are formed and through which light is emitted, will hereinafter be referred to as the light-emitting portions 49a and 49b). In the predetermined regions 149a and 149b, in which the reflection steps 47 are not formed, the surfaces of the light guides 40a and 40b are roughened by, for example, graining, so that part of the guided light is emitted through the side surfaces of the light guides 40a and 40b.

Specifically, the light incidence end portions 43a and 43b of the light guides 40a and 40b are fixed to the LED assembly 70 behind the LED assembly attachment portion 130, are drawn into the LED assembly attachment portion 130, and are disposed so that the predetermined regions 149a and 149b near the light incidence end portions 43a and 43b are close to each other in substantially parallel with each other. Then, the light guides 40a and 40b are disposed so that the light guides 40a and 40b are branched (the branches will hereinafter be referred to as the branch portions $149a_1$ and $149b_1$) and the light-emitting portions 49a and 49b are extended to the other end portions 42a and 42b along the groove 31 of the extension 30 so as to separate from each other (FIGS. 1 and 2).

Thus, the predetermined regions 149a and 149b (hereinafter referred to as the end-branch portion regions 149a and 149b) from the light incidence end portions 43a and 43b to the branch portions $149a_1$ and $149b_1$ form a light guide neighboring region R, in which the light guides 40*a* and 40*b* are close to each other. In FIG. 5, the light guide neighboring region R is indicated by the gray area. In the light guide neighboring region R, an acute-angular gap 41 is formed due to the branching between the branch portion 149*a*$_1$ and the branch portion 149*b*$_1$ (FIGS. 2 and 5). If the gap 41 can be directly seen through the outer cover 4, the branching of the light guides 40*a* and 40*b* can be seen when the LEDs 71*a* and 71*b* are unlit and on the other hand, when the LEDs 71*a* and 71*b* are lit, the emitted light shows the branched shape, which can impair the appearance.

The light-shielding cover 160, which is part of the extension 30, is a synthetic resin cover that is curved in conformity with the form (rounded shape) of the extension 30. The surface 166 of the light-shielding cover 160 as well as the surface 35 of the extension 30 is aluminized and the light-shielding cover 160 is disposed so as to close an upper right opening 131 of the extension 30.

Specifically, a fixing portion 163 provided at a rear end portion 164 of the light-shielding cover 160 is fixed to the rear opening 134 of the extension 30 by projection-and-pit lance engagement, so that the rear end portion 164 forms part of the rear opening 134 and a front end portion 162 forms part of the opening 31*a* of the groove 31. As a result, the surface 166 of the light-shielding cover 160 becomes flush with the surface 35 of the extension 30, so that the light-shielding cover 160 is integrated with the extension 30. Note that the light-shielding cover 160 may be integrated via publicly-available attachment means, such as adhesive agent, instead of the projection-and-pit lance engagement.

A translucent curved lens 60 is integrally formed at the front end portion 162 of the light-shielding cover 160 by double molding.

The curved lens 60 is a diffusion cover, which is a clear synthetic resin lens that is curved to concave toward the outer cover 4 side so as to cover the gap 41. A proximal end portion 64 of the curved lens 60 coincides with the front end portion 162 of the light-shielding cover 160. Side edge portions 66*a* and 66*b* are shaped in conformity with the forms of the light guides 40*a* and 40*b*, so that the side edge portions 66*a* and 66*b* are positioned across the front sides of the branch portions 149*a*$_1$ and 149*b*$_1$ of the light guides 40*a* and 40*b*. A tip portion 62 of the curved lens 60 is positioned so as to bridge the inside gap between the light guides 40*a* and 40*b* (FIGS. 4 and 6).

In other words, in the light guide neighboring region R, the front side of the gap 41 and the branch portions 149*a*$_1$ and 149*b*$_1$ is covered by the curved lens 60 and the front side of the light incidence end portions 43*a* and 43*b* and the end-branch portion regions 149*a* and 149*b* is covered by the light-shielding cover 160 (extension 30).

Thus, because the light passing through the curved lens 60 from the inside is refracted and diffused by the curved lens 60, when the LEDs 71*a* and 71*b* are unlit, the gap 41 between the branch portions 149*a*$_1$ and 149*b*$_1$ in the light guide neighboring region R is covered by the curved lens 60 and is therefore hard to see because of distortion, so that the gap 41 is hidden and the light guides 40*a* and 40*b* appear as if they are continuous at the upper right portion when viewed from the front of the lamp.

When the LEDs 71*a* and 71*b* are lit, the light from the LEDs 71*a* and 71*b* incident on the light incidence end portions 43*a* and 43*b* partially leaks in the end-branch portion regions 149*a* and 149*b* and is guided toward the other end portions 42*a* and 42*b* to be emitted through the light-emitting portions 49*a* and 49*b* toward the front of the lamp (that is, toward the outer cover 4) by the reflection steps 47.

The light that leaks from the end-branch portion regions 149*a* and 149*b* and that is unwanted in view of the purpose of making the entire light guides (lamp C) appear as if the light guides emit light in the C shape that is inclined to rise toward the right and that conforms with the form (rounded shape) of the headlamp 1, is shielded by the light-shielding cover 160. At the same time, part of the light emitted through the branch portions 149*a*$_1$ and 149*b*$_1$ and the light leaking from the end-branch portion regions 149*a* and 149*b* is incident on the curved lens 60 and refracted and diffused at the inner surface of the curved lens 60, so that the light is emitted through the curved lens 60 so as to fill the gap 41.

Thus, the entire light guides (lamp C) appear as if there is no gap and a continuous object is emitting light with the light emitted through the light-emitting portion 49*a* of the light guide 40*a*, the light emitted through the curved lens 60, and the light emitted through the light-emitting portion 49*b* of the light guide 40*b* joined with each other in a line shape, so that it appears as if a linear light guide (light-emitting object) is emitting light.

Part of the guided light that is incident on the fixing portion 50 extending toward the rear of the lamp and on the ribs 48 formed on the light-emitting portions 49*a* and 49*b* of the light guides 40*a* and 40*b* leaks rearward with respect to the light guides 40*a* and 40*b*. However, because the back sides of the light guides 40*a* and 40*b* are covered by the reflector portion 30 of the extension 30, the leak light is reflected by the front surface 33 of the reflector portion 30*a*, directed toward the front of the lamp (toward the outer cover 4), and returned into the light guides 40*a* and 40*b*, so that the leak light is effectively used without waste.

The curved lens 60, which is a diffusion cover, is provided, in a minimum manner, just at the position covering the branch portions 149*a*$_1$ and 149*b*$_1$ of the light guide neighboring region R, at which the gap 41 is formed between the light guides 40*a* and 40*b*, so that a sense of continuity in appearance of the light guides is provided by simple components.

In addition, because the curved lens 60 and the light-shielding cover 160 are integrally formed by double molding, when the light-shielding cover 160 is attached to the upper right opening 131, the curved lens 60 is disposed in front of the light guide neighboring region R (that is, in front of the gap 41) and therefore, installation is easy.

Figure 7:
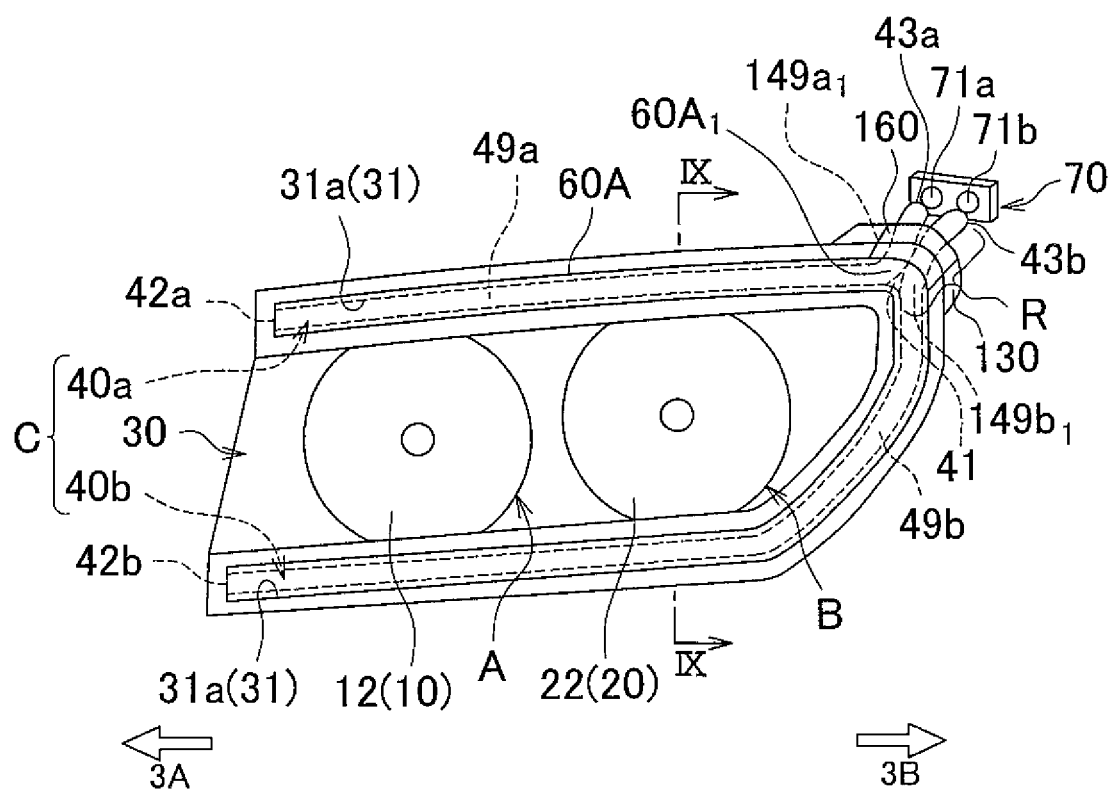
FIG. 7 is a front view of a headlamp according to a second embodiment with the outer cover and the lamp body removed.
Figure 8:
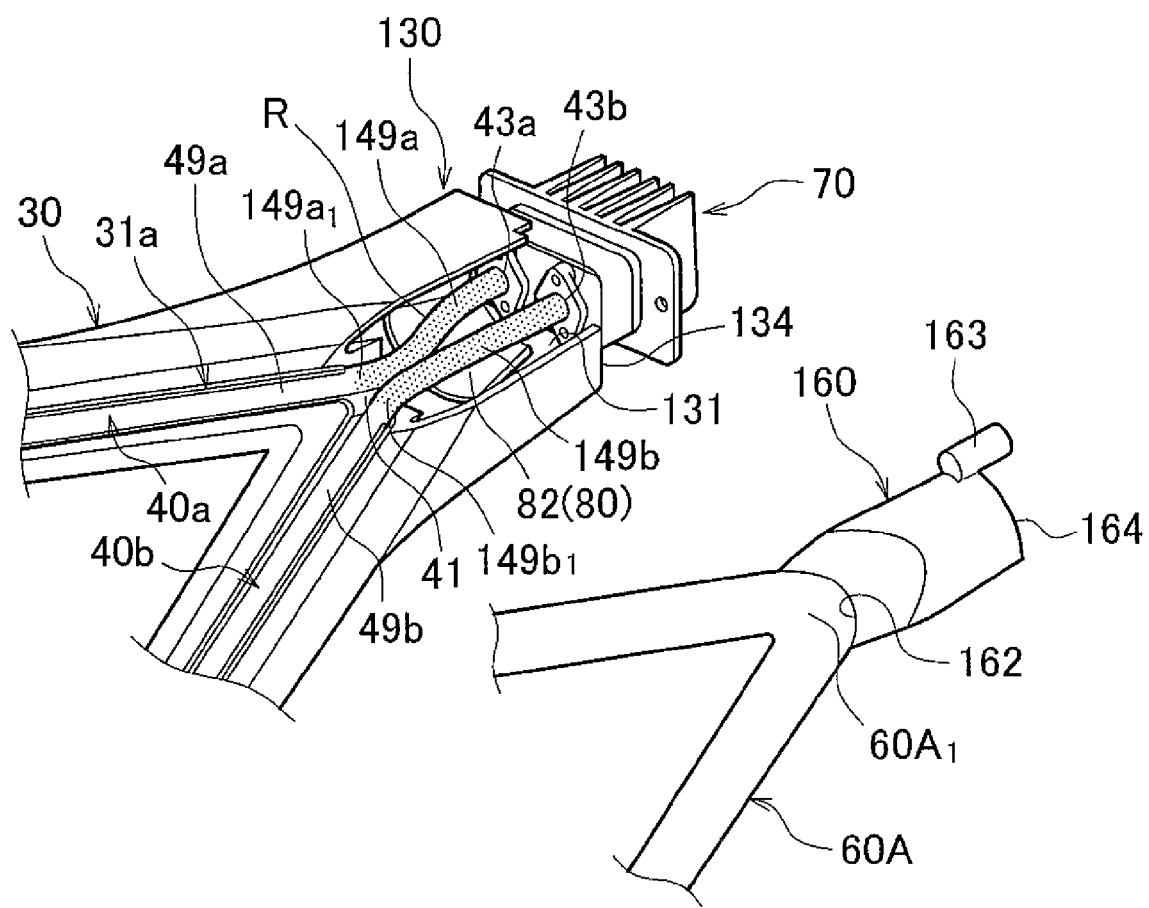
FIG. 8 is an enlarged perspective view of a main portion of the headlamp with a cover removed.

FIGS. 7 to 9 show a second embodiment of the present invention. FIG. 7 is a front view of a headlamp according to the second embodiment with the outer cover and the lamp body removed. FIG. 8 is an enlarged perspective view of a main portion of the headlamp with a cover removed. FIG. 9 is a longitudinal cross-sectional view of the headlamp (cross-sectional view taken along the line IX-IX shown in FIG. 7). Note that the LED assembly 70 is simplified in FIG. 7. In FIG. 9, portions of the lamp C are shown in circles, in which the portions are enlarged. The upper circle corresponds to the portion, in which a projection-and-pit lance engagement portion is formed, and the lower circle corresponds to the portion, in which there is no engagement portion.

The second embodiment is similar to the first embodiment, except that a curved cover 60A instead of the curved lens 60 is provided as the diffusion cover and that a sub-reflector 80 is provided in the LED assembly attachment portion 130.

The curved cover 60A is a clear synthetic resin lens having a C shape that is inclined to rise toward the right when viewed from the front and that conforms with the form of the headlamp 1, which lens is formed integrally with the front end portion 162 of the light-shielding cover 160 by double molding. The cross section of the curved cover 60A has a semicircular shape having a curve convex toward the outer cover 4 side and is larger than that of the light guides 40*a* and 40*b*. The curved cover 60A is attached to the front surface portions of the step portions 32 formed at the opening 31*a* of the groove 31 of the extension 30 by well-known means, such as adhesive agent (FIG. 9).

Thus, the curved cover 60A is placed not only in front of the branch portions 149*a*$_1$ and 149*b*$_1$ and the gap 41 but also in front of the light-emitting portions 49*a* and 49*b*, so that the curved cover 60A covers the entire light guides 40*a* and 40*b* (FIG. 7).

The sub-reflector 80 is disposed behind the end-branch portion regions 149*a* and 149*b* in the LED assembly attachment portion 130. The sub-reflector 80 has a shovel-like shape whose width increases in the direction from the light incidence end portions 43*a* and 43*b* toward the branch portions 149*a*$_1$ and 149*b*$_1$ and an inner surface 82 of the sub-reflector 80 is aluminized and grained, so that the light reflected by the inner surface 82 is directed toward the front of the lamp (that is, toward the outer cover 4).

When the LEDs 71*a* and 71*b* are lit, the light emitted through the light-emitting portions 49*a* and 49*b* of the light guides 40*a* and 40*b* and the light emitted through the branch portions 149*a*$_1$ and 149*b*$_1$ are refracted and diffused at the inner surface of the curved cover 60A extending in front of the light guides 40*a* and 40*b* and emitted toward the front of the lamp.

The light that leaks from (the end-branch portion regions 149*a* and 149*b* of) the light guide neighboring region R is reflected by the inner surface 82 of the sub-reflector 80 toward the front of the lamp and part of the reflected light is emitted through the curved cover 60A (the neighboring portion 60A$_1$ of the light guide neighboring region R thereof), so that the amount of light emitted through the neighboring portion 60A$_1$ that is close to the neighboring region R increases, which makes the entire curved cover 60A appear as if it emits light uniformly. At the same time, as in the case of the first embodiment, the light that leaks from the end-branch portion regions 149*a* and 149*b* and that is unwanted in view of the purpose of making the entire light guides (lamp C) appear as if the light guides emit light in the C shape that is inclined to rise toward the right and that conforms with the form (rounded shape) of the headlamp 1, is shielded by the light-shielding cover 160.

Thus, the light emitted through the light guides 40*a* and 40*b* appears as if a continuous object is emitting light in the line shape of the curved cover 60A and the sub-reflector 80 enhances the continuity or unity in appearance, so that the appearance while the LEDs 71*a* and 71*b* are lit is favorable.

In addition, when the LEDs 71*a* and 71*b* are unlit, what can be seen through the outer cover 4 is the front side of the curved cover 60A that covers the light guides 40*a* and 40*b* from the front side and the light transmitted from the inside is refracted and diffused at the inner surface of the curved cover 60A, so that the shape of the light guides 40*a* and 40*b* as well as the gap 41 in the light guide neighboring region R is distorted and can hardly be recognized. Thus, it appears as if a linear light-emitting object having the shape of the curved cover 60A is emitting light, so that the appearance under daylight (the LEDs 71*a* and 71*b* are unlit) is further improved.

In addition, because the curved cover 60A and the light-shielding cover 160 are integrally formed, when the curved cover 60A is attached to the opening 31*a* of the extension 30, the light-shielding cover 160 is disposed at the upper right opening 131 and therefore, installation is easy.

Note that the sub-reflector 80 may be used also in the first embodiment.

Figure 10:
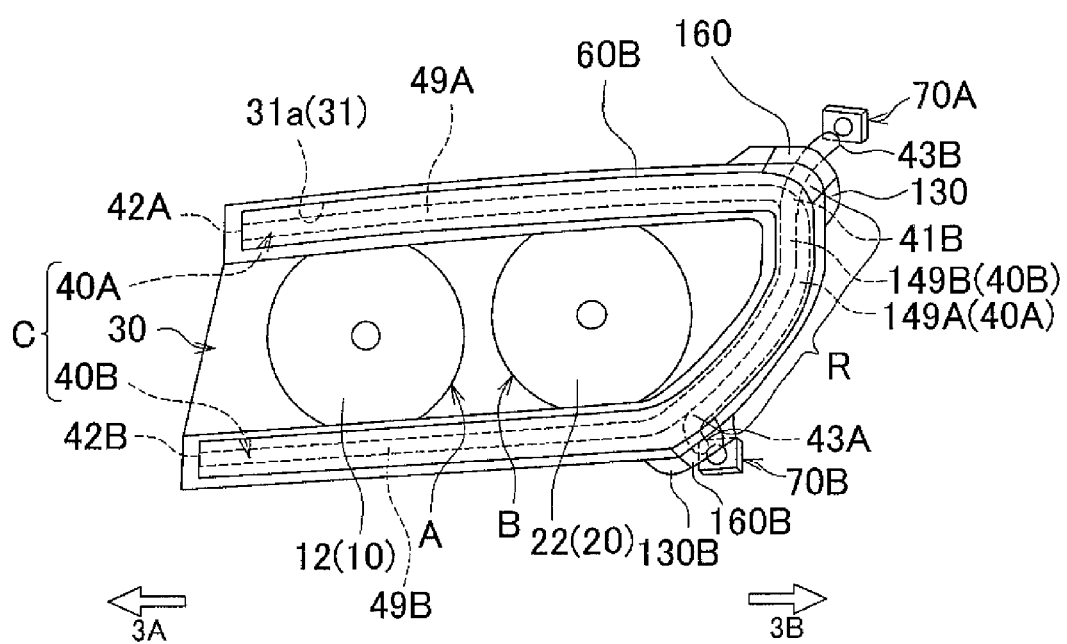
FIG. 10 is a front view of a headlamp according to a third embodiment of the present invention with the outer cover and the lamp body removed.

FIG. 10 is a front view of a headlamp according to a third embodiment of the present invention with the outer cover and the lamp body removed. In FIG. 10, LED assemblies 70A and 70B are simplified.

The third embodiment is similar to the second embodiment, except that the linear light guides 40*a* and 40*b* of the second embodiment are changed in shape into linear light guides 40A and 40B as described later, the curved cover 60A is changed in shape into a curved cover 60B in conformity with the light guides 40A and 40B, an LED assembly attachment portion 130B is provided also at a lower right position when viewed from the front, and a light-shielding cover 160B is provided also at the LED assembly attachment portion 130B.

The linear light guides 40A and 40B each have a generally L shape and the light guide 40A is extended from a light incidence end portion 43A connected to the LED assembly 70B and drawn into the LED assembly attachment portion 130B, and is attached to (the groove 31 of) the extension 30, so that the light guide 40A is disposed at the upper and right areas when viewed from the front of the lamp. The light guide 40B is extended from a light incidence end portion 43B connected to the LED assembly 70A and drawn into the LED assembly attachment portion 130, and is attached to the groove 31, so that the light guide 40B is disposed at the right and lower areas when viewed from the front of the lamp.

Specifically, the light guides 40A and 40B are arranged so that predetermined regions 149A and 149B (hereinafter referred to as the parallel light-emitting portions 149A and 149B) near the light incidence end portions 43A and 43B are placed side by side to form the right side of the lamp C, and the other light-emitting portions 49A and 49B (hereinafter referred to as the separate light-emitting portions 49A and 49B) are extended to the other end portions 42A and 42B so as to separate from each other.

Thus, the parallel light-emitting portions 149A and 149B, in which the light guides 40A and 40B are close to each other, form the light guide neighboring region R, in which the light guides 40A and 40B are close to each other. In FIG. 10, such a light guide neighboring region R is indicated by a curly bracket symbol. In the light guide neighboring region R, there is a portion (light guide intersection portion 41B), in which the light guides 40A and 40B intersect each other when viewed along the front-back direction of the lamp.

The light guides 40A and 40B are formed so that the pitch of the reflection steps 47 in the parallel light-emitting portions 149A and 149B corresponding to the light guide neighboring region R is greater than that of the reflection steps 47 that are provided in the separate light-emitting portions 49A and 49B (that is, the density of the reflection steps 47 in the parallel light-emitting portions 149A and 149B is lower than that in the separate light-emitting portions 49A and 49B). Thus, the amount of light emitted from the light guide neighboring region R is adjusted so that the light emitted from the light guide neighboring region R has a brightness close to that of the light emitted through the separate light-emitting portions 49A and 49B In addition, the curved cover 60B has a width substantially equal to that of two light guides so as to cover the front side of the light guide neighboring region R (parallel light-emitting portions 149A and 149B) and is disposed to extend in a shape similar to that of the second embodiment.

The light-shielding cover 160B is integrated so as to be flush with the surface 35 of the extension 30 by attaching the light-shielding cover 160B so as to conform with the form (rounded shape) of the extension 30 and close the lower right opening (not shown). In other words, the light-shielding covers 160 and 160B are shaped so as to cover the vicinities of the light incidence end portions 43B and 43A, respectively.

If the curved cover 60B is not provided, the light guide intersection portion 41B of the light guides 40A and 40B in the light guide neighboring region R can be seen through the outer cover 4 when the LEDs 71a and 71b are unlit, which impairs the appearance. In addition, when the LEDs 71a and 71b are lit, light is emitted through two light guides in the light guide neighboring region R (the light guide intersection portion 41B and the parallel light-emitting portions 149A and 149B) and therefore, the light emitted from the light guide neighboring region R is brighter than that emitted through the separate light-emitting portions 49A and 49B. As a result, the brightness differs and it does not appear as if a continuous light guide (light-emitting object) is emitting light.

However, when this part is covered by the curved cover 60B, as in the case of the second embodiment, when the LEDs 71a and 71b are unlit, what can be seen through the outer cover 4 is the front side of the curved cover 60B only and the shapes of the light guides 40A and 40B themselves as well as the light guide intersection portion 41B and the parallel light-emitting portions 149A and 149B are distorted and become hard to recognize, so that it appears as if a continuous light-emitting object is disposed. Note that because the light guides 40A and 40B themselves are hard to see, it is also hidden that the pitch of the reflection steps 47 in the light guide neighboring region R alone differs from those of the other regions.

When the LEDs 71a and 71b are lit, as in the case of the second embodiment, the light emitted through the separate light-emitting portions 49A and 49B and the parallel light-emitting portions 149A and 149B are refracted and diffused at the inner surface of the curved cover 60B, which results in the light emission in the shape of the curved cover 60B, and in addition, because the unwanted light that comes from the vicinity of the light incidence end portions 43A and 43B is shielded by the light-shielding covers 160 and 160B, it appears as if a single light-emitting object equal in shape to the curved cover 60B is emitting light.

Moreover, because the amount of light emitted from the light guide neighboring region R (parallel light-emitting portions 149A and 149B) is adjusted, or regulated and the light guide neighboring region R therefore emits light with a brightness close to that of the light emitted through the separate light-emitting portions 49A and 49B, it appears as if the entire lamp C is uniformly emitting light, so that light emission that provides a sense of unity in appearance is achieved.

Figure 11:
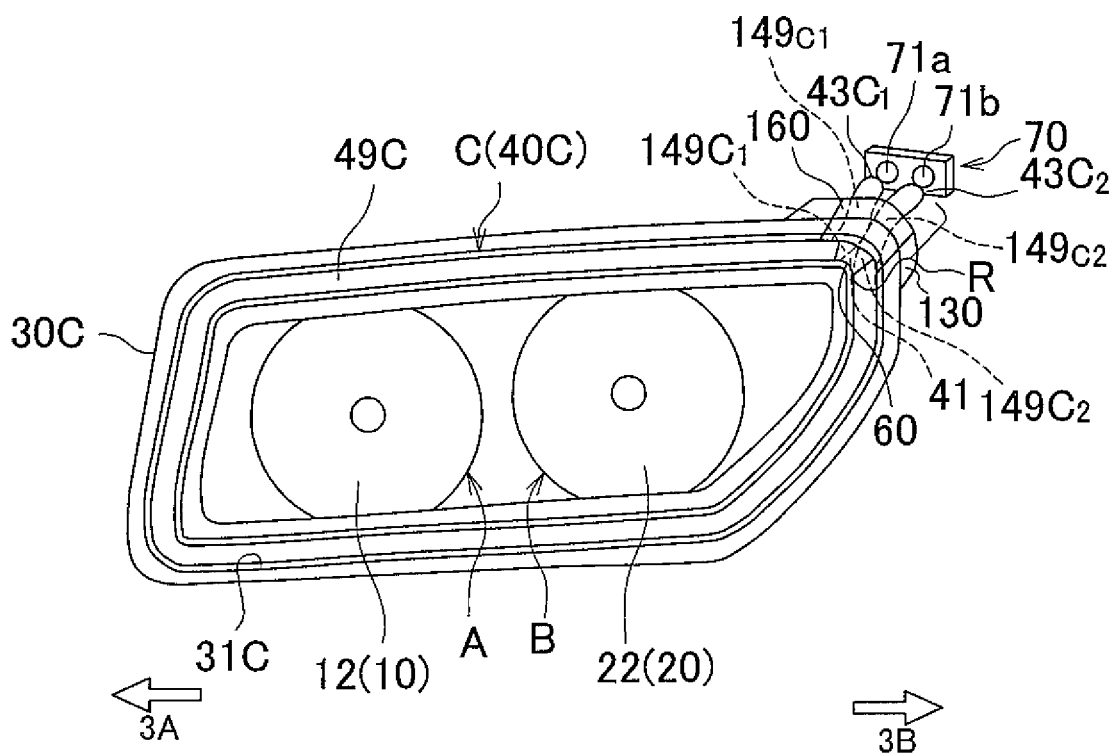
FIG. 11 is a front view of a headlamp according to a fourth embodiment with the outer cover and the lamp body removed.

FIG. 11 is a front view of a headlamp according to a fourth embodiment with the outer cover and the lamp body removed. In FIG. 11, the LED assembly 70 is simplified.

The fourth embodiment is similar to the first embodiment, except that the lamp C of the first embodiment is replaced by a single linear light guide 40C and the extension 30 is changed in shape into an extension 30C in conformity with the shape of the light guide 40C.

The light guide 40C is configured so that both end portions 43$C_1$ and 43$C_2$ are connected to the LED assembly 70 to serve as light incidence end portions 43$C_1$ and 43$C_2$, predetermined regions (end-branch portion regions) 149$c_1$ and 149$c_2$ near the light incidence end portions 43$C_1$ and 43$C_2$ are arranged side by side in parallel in the LED assembly attachment portion 130, and a light-emitting portion 49C is looped along a groove 31C of the extension 30C.

Thus, as in the case of the first embodiment, an acute-angular gap 41 is formed between a branch portion 149$C_1$ and a branch portion 149$C_1$.

However, as in the case of the first embodiment, regardless of whether the LEDs 71a and 71b are lit or unlit, the lamp C appears as if it is continuous at the upper right portion when viewed from the front of the lamp, that is, as if it is a complete loop-shaped light guide (light-emitting object), owing to the curved lens 60 that is disposed in front of the gap 41 in the light guide neighboring region R and the branch portions 149$C_1$ and 149$C_2$.

Even when the end portions (light incidence end portions) 43$C_1$ and 43$C_2$ of the linear light guide 40C are crossed as described in Japanese Patent Application Laid-Open (Kokai) No. 2009-295552, by adjusting the pitch of the reflection steps 47 in the part corresponding to the intersecting portion, the effect, similar to that of the third embodiment, that the entire lamp C appears as if it is a loop-shaped light guide that uniformly emits light, is achieved.

Note that in this case, by adopting the configuration, in which the entire light guide 40C is covered by the curved cover as in the cases of the second and third embodiments, the adjustment of brightness is made easy and the unity in appearance of the light guide (light-emitting object) is further improved.

In addition to the above-described first to fourth embodiments, as another embodiment for disposing the light guide so as to be offset from a luminous region of the other light source unit(s), a mode may be employed, in which two linear light guides that each have a generally L shape are combined, the two end portions of one of the light guides are positioned adjacent to the two end portions of the other of the light guides, respectively, the one of the light guides is disposed at the upper and right areas when viewed from the front of the lamp, and the other of the light guides is disposed at the lower and left areas when viewed from the front of the lamp, for example, whereby the light guides form a generally rectangular shape. Alternatively, another embodiment may be employed, in which two linear light guides are disposed so that the two end portions of one of the light guides are positioned adjacent to the two end portions of the other of the light guides, respectively, to form a polygonal shape or an elliptical shape in conformity with the form of the lamp. In this case, because there are two or more light guide neighboring regions R, by providing the light-shielding cover and the curved lens (or the curved cover) according to the present invention for each of the light guide neighboring regions R, the effect similar to those of the above-described embodiments is achieved that it appears as if a continuous, linear light guide (light-emitting object) is emitting light (is disposed) as in the cases of the above-described embodiments.

Note that while the curved lens or the curved cover is used as the translucent diffusion cover in the above-described first to fourth embodiments, a similar effect is achieved by employing a flat cover instead of the curved cover as the translucent diffusion cover and providing the inner surface of the flat cover with diffusion means, such as fisheye steps, to diffuse the light emitted through the light guides, up and down, left and right.

While the diffusion cover and the light-shielding cover are integrally formed by double molding in the first to fourth embodiments, a mode may be employed, in which the diffusion cover and the light-shielding cover are integrally formed and then, part of the diffusion cover is masked to form a light-shielding cover portion. If the design of the headlamp allows, the diffusion cover and the light-shielding cover may be provided separately.

While the light-shielding cover is formed as part of the extension in the above-described first to fourth embodiments, the light-shielding cover may be provided separately.

The shape of the cross section of the linear light guide may be an elliptical shape or a rounded rectangular shape.

The light distribution formation portion provided on the linear light guide may be dots formed by stippling instead of employing the reflection steps 47. While the reflection steps 47 are formed in all of the first to fourth embodiments, it is unnecessary to form the reflection steps 47.

The diffusion cover may be provided in front of the light guide neighboring region only.

When the diffusion cover is provided just at the position covering the light guide neighboring region only, at which a discontinuity of the light guide(s) occurs, a sense of continuity in appearance of the light guide(s) is provided by a minimum structure. The required components are simple because of the minimum structure.

The diffusion cover may be provided in front of the light guide neighboring region and the light-emitting portion.

When the light-emitting portion as well as the light guide neighboring region is covered, the diffusion cover is provided in front of the entire light guide(s), so that the light emitted through the side surface of the light guide(s) is diffused at the inner surface of the diffusion cover extending in front of the light guide(s), so that it appears as if light is emitted in the shape of the diffusion cover.

When the light source is unlit, what can be seen through the outer cover is the front side of the diffusion cover only that covers the front side of the light guide(s) and the shape(s) of the light guide(s) is/are hard to recognize, so that it appears as if a continuous linear light guide is disposed. In particular, the appearance under daylight (when the light source is unlit) is further improved.

A reflector that directs light emitted through the side surface of the light guide toward the outer cover may be disposed behind at least one of the light guide neighboring region and the light-emitting portion.

When the reflector is disposed behind the light guide neighboring region, the light from the light guide neighboring region is reflected by the reflector toward the outer cover (toward the front of the lamp) and part of the reflected light is incident on the diffusion cover disposed in front of the light guide neighboring region and is then diffused and emitted toward the front of the lamp. Thus, the amount of light emitted through the diffusion cover increases, so that the continuity or unity in appearance of the light guide neighboring region when the light source is lit is enhanced.

In addition, when the reflector is disposed behind the light-emitting portion, the light that leaks from the back side surface of the light guide toward the rear of the lamp is reflected by the reflector toward the outer cover (toward the front of the lamp) and returned into the light guide(s). Thus, the light that leaks from the back side surface of the light guide(s) is effectively used without waste.

The diffusion cover may be formed integrally with the light-shielding cover by integral molding.

With this configuration, when the light-shielding cover is attached to a predetermined portion, the diffusion cover is automatically disposed at the desired position. Conversely, when the diffusion cover is attached to a predetermined portion, the light-shielding cover is automatically disposed at the desired position and therefore, installation of these covers is easy.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A vehicular lamp comprising:
an outer cover and a lamp body that define a lamp chamber;
a light source unit that is disposed in the lamp chamber;
a linear light guide that is provided between the outer cover and the light source unit and is configured so that light incident on a light incidence end portion of the light guide is repeatedly reflected inward to be guided and the guided light is emitted through a side surface of the light guide; and
a light source that faces the light incidence end portion of the light guide,
wherein:
the light guide has a light guide neighboring region, in which a light incidence end side portion that is a portion of the light guide on a side closer to the light incidence end portion and another light incidence end side portion of the same or another light guide neighbor each other;
a light-emitting portion of the light guide is disposed so as to be offset from a luminous region of the light source unit and to have portions that extend from the light guide neighboring region and separate from each other;
a translucent diffusion cover that covers the light guide neighboring region is provided at least in front of the light guide neighboring region;
wherein the vehicular lamp further includes:
another linear light guide that is provided between the outer cover and the light source unit and is configured so that light incident on a light incidence end portion of the other light guide is repeatedly reflected inward to be guided and the guided light is emitted through a side surface of the other light guide; and
another light source that faces the light incidence end portion of the other light guide,
wherein a light-emitting portion of the other light guide is disposed so as to be offset from a luminous region of the light source unit and to have portions that extend from the light guide neighboring region and separate from each other;
wherein the light incidence end portions of the light guide and the other light guide are provided adjacent to each other in the light guide neighboring region.

2. The vehicular lamp according to claim 1, wherein a light-shielding cover that covers the light incidence end portion is provided adjacent to the diffusion cover.

3. The vehicular lamp according to claim 2, wherein the diffusion cover is formed integrally with the light-shielding cover by integral molding.

4. The vehicular lamp according to claim 1, wherein the diffusion cover is provided in front of the light guide neighboring region only.

5. The vehicular lamp according to claim 1, wherein the diffusion cover is provided in front of the light guide neighboring region and the light-emitting portion.

6. The vehicular lamp according to claim 1, wherein the a reflector that directs light emitted through the side surface of the light guide toward the outer cover is disposed behind at least one of the light guide neighboring region and the light-emitting portion.

7. The vehicular lamp according to claim 1, wherein the side surface of the light guide is provided with a light distribution formation portion throughout a length of the light guide except a predetermined region near the light incidence end portion, and a density of the light distribution formation portion in the light guide neighboring region is lower than in the other region.

8. The vehicular lamp according to claim 7, wherein the light distribution formation portion includes reflection steps or dots.

9. The vehicular lamp according to claim 1, wherein the light emitting portion of the light guide is disposed so as to surround the light source unit.

* * * * *